Aug. 26, 1969    R. E. WARNER    3,463,514
TRAILER HITCH ASSEMBLY
Filed Jan. 17, 1968    2 Sheets-Sheet 1
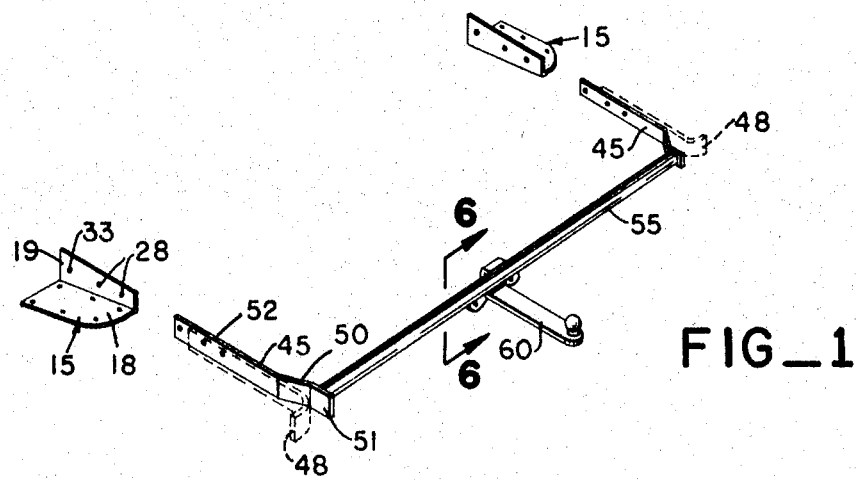
FIG_1
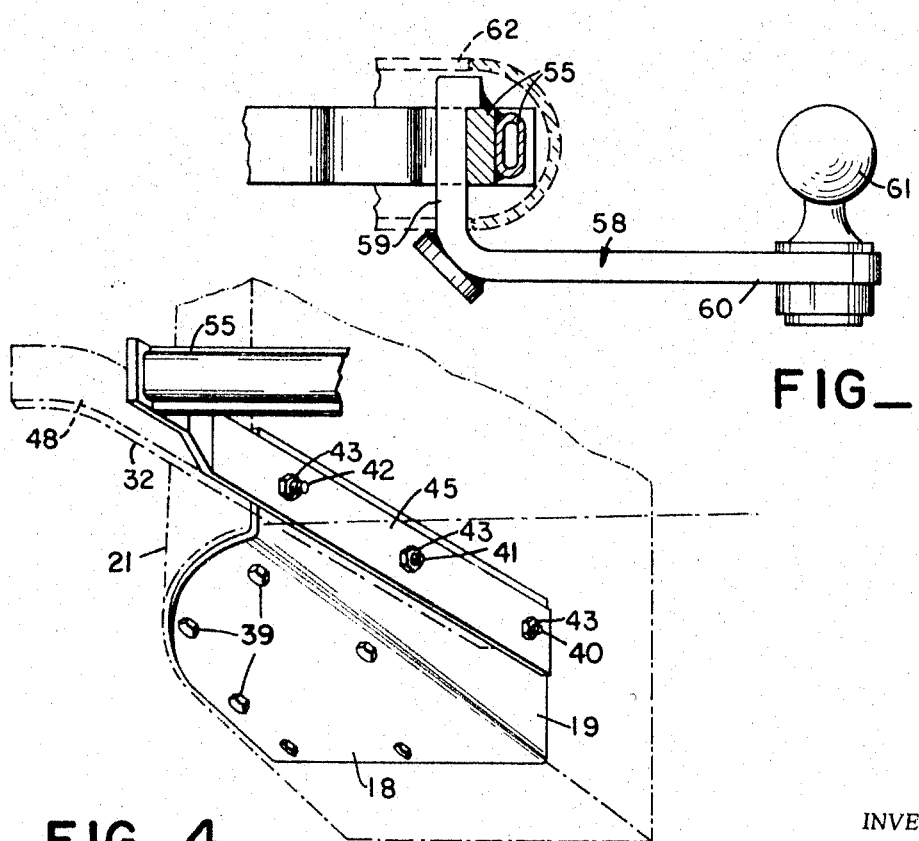
FIG_6
FIG_4
INVENTOR.
RICHARD E. WARNER
BY
Townsend and Townsend
ATTORNEYS

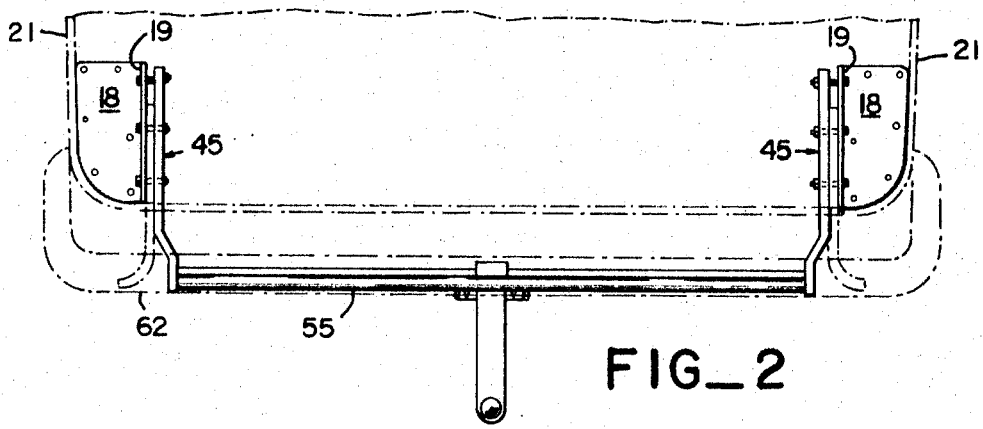
FIG_2
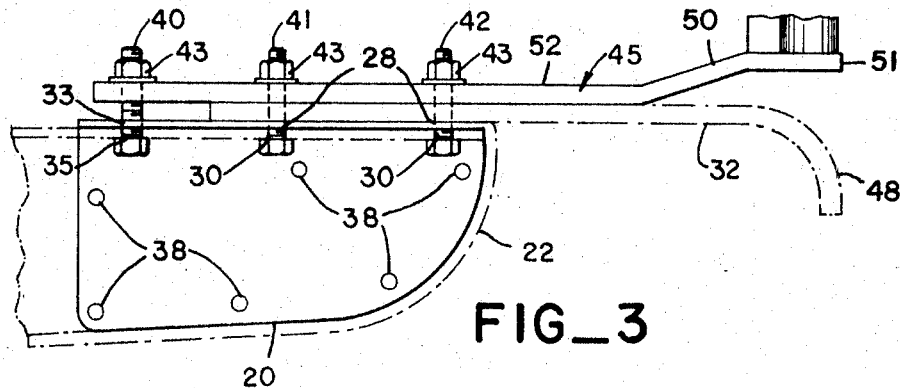
FIG_3
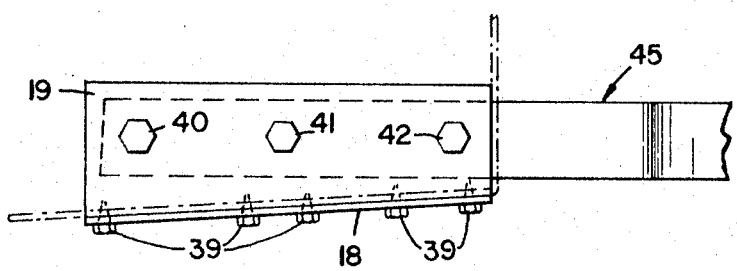
FIG_5

United States Patent Office 3,463,514
Patented Aug. 26, 1969

3,463,514
TRAILER HITCH ASSEMBLY
Richard E. Warner, Lodi, Calif., assignor to Valley Tow-Rite, Inc., Lodi, Calif., a corporation of California
Filed Jan. 17, 1968, Ser. No. 698,604
Int. Cl. B60d 1/00
U.S. Cl. 280—495                                            2 Claims

ABSTRACT OF THE DISCLOSURE

A trailer hitch mounting assembly for frameless type vehicles in which heavy metal L-shaped brackets are connected to large horizontal and vertical surface areas of the vehicle body to thereby afford a structural fastening of the trailer support assembly which is capable of carrying trailer loads.

---

This invention relates to a novel mounting bracket assembly for mounting a trailer hitch ball to certain types of vehicles.

There are certain types of motor vehicles such as the vehicles commonly made by Volkswagen of the "fastback" and station wagon series in which the body structure is both the frame and body of the vehicle. In such automobiles there is normally an insufficient area of rigid or heavy metal to conveniently carry a trailer hitch mounting assembly in such a manner as to allow the assembly to carry the loads usually encountered by such trailer hitches.

In the present invention an elongated L-shaped bracket is formed to be mounted in a position overlying the previously formed bumper mounting, reinforced areas and which provides an overlay for engagement of the bracket to the fender well and sidewall body areas of the vehicle. In the assembly of the present invention, the bracket carries the bumper support and a U-shaped crossbar assembly in such a manner as to allow the bumper to overlie the crossbar, the crossbar thereby affording a stiffener which can support at its midpoint the ball for a trailer mount.

A feature and advantage of this invention lies in the fact that the ornamental and aesthetic qualities of the bumper are maintained with the reinforcing elements being located in a visually obscure position behind the bumper thereby preserving aesthetic appeal and affording structural rigidity for reinforcing the ball-carrying assembly.

The present invention is concerned with a provision of a U-shaped plate which engages a substantial surface area in both the vertical and horizontal aspects of the vehicle so that the load bearing stresses applied in trailer pulling applications are shared over a sufficiently wide area of the relatively thin metal body to thereby afford a body connection capable of carrying trailer load capacities.

Other objects, features and advantages of the present invention will be more apparent after referring to the following specification and accompanying drawings in which:

FIG. 1 is a perspective view showing the body-stiffening bracket and trailer support assembly;

FIG. 2 is a top plan view of the assembly shown in FIG. 1 showing the two members mounted together and showing in fragmentary lines the relationship of the vehicle body and bumper thereto;

FIG. 3 is an enlarged view showing the body stiffener and connecting arm for the trailer assembly taken from the bottom;

FIG. 4 is an enlarged perspective view showing the arms as shown in FIG. 3;

FIG. 5 is an elevational view showing the body-stiffening member and a fragmentary portion of the trailer frame; and FIG. 6 is a cross-sectional view of the trailer hitch assembly taken at line 6—6 of FIG. 1.

In the principal embodiment of the invention, the mounting apparatus for the trailer hitch is shown in structural conformity for mounting on vehicles manufactured by Volkswagen and classified as the "fastback" line. Such vehicles are characterized by their absence of a frame member at the rear of the vehicle thereby affording no area of stiff or thick metal upon which a trailer-pulling hitch assembly can be connected. In such vehicles, the rear portion of the automobile is formed by sheet metal forming the body of the vehicle. Load-bearing connection of a trailer hitch assembly is thereby accomplished as shown in the drawings by providing a pair of L-shaped, body-stiffening brackets 15. Each of the brackets is provided with a horizontal segment 18 and a vertical segment 19 which extends upwardly from the horizontal segment at approximately 90°. Each horizontal segment is formed with an outer edge 20 conforming to the underside of the fender 21 of the vehicle. In order to accomplish the contouring, a convex, arcuate edge 22 is formed at the rear end of edge 20 of brackets 15. The upwardly extending vertical segment 19 is arranged to engage the vertical sidewall of the impression formed between the two fender wells of the vehicle. The vertical wall or segment 19 is formed with a first pair of apertures 28 which are spaced and orientated to overlie apertures 30 formed in the vehicle for conventionally supporting the bumper-supporting bracket 32. An additional aperture 33 is provided more forwardly and in line with the two apertures 28 to engage a newly formed aperture 35 in the vehicle body wall. A plurality of smaller apertures 38 are formed in the horizontal segment 18 of body-stiffening brackets 15. Metal screws 39 are engaged with the aforesaid apertures 38 into fastening engagement with the horizontal undersurface of the fender sections of the vehicle for positive broad-faced fastening engagement therewith.

A series of three bolts 40, 41 and 42 are connected by appropriate nuts 43 to fasten the bumper support bracket 32 through the two bolts or apertures 30 and overlie the bumper support bracket 32, a trailer support arm 45 which is engaged by both the bolts 30, and by the forwardly extending bolt 35. In the thus fitted fashion, the trailer support arm 45 and the bumper support arm 32 are in parallel juxtapositioned relation with the terminating end of the bumper support arm extending outwardly for bumper support at its terminating end 45. The terminating end of trailer hitch supporting arm 45 is bent inwardly at 50 at a slight angle and thence terminates with a tip 51 which is in parallel relationship to the main body section 52 of arm 45 whereby the two tips 51 are in spaced apart, parallel relationship to carry a mounting bar or tube 55 which is mounted on and extends between the two tips 51. A trailer hitch ball mount bracket 58 is welded on bar 55 and extends down therefrom at 59 and thence rearwardly to form a trailer ball mounting plate 60. The tip of plate 60 is apertured to receive a conventional trailer mounting ball 61. In this device, the conventional bumper 62 of the vehicle is mounted to overlie the tube 55 with the tube being in the concave area of the bumper. The ends of the bumper are affixed to the terminating ends 48 of bumper support arms 32. It can thus be seen that the bumper in the aforesaid mounted condition conceals from obvious view the tube 55 and its supporting arms 45.

In mounting the aforesaid structure to the vehicle, the bumper is removed by removing bumper support arms 32 from the vehicle. Stiffening plates 15 are then mounted in place with the two apertures 28 of bracket 15 overlying the two apertures 30 formed in the vehicle for bumper mounting purposes.

A new hole is drilled in the vehicle body in axial alignment with hole 33 of bracket 15. Machine screws are inserted in their respective holes 38 for fastening engagement of the bracket to the underside of the fender well body sheet metal of the vehicle. The fender support bracket 32 is then mounted in juxtaposition with arms 45 and with their respective mounting apertures disposed in axial alignment. In such a position, the assembly is then aligned so that bolts 40, 41 and 42 can be inserted for bolting the respective members in fixed position as shown in the drawings. Bumper 62 is then installed by connecting the bumper to terminal ends 48 of bumper support arm 32 by appropriate fasteners.

It can thus be seen that with the stiffening support provided by bracket 15 and with the combination of the tube support arms 45 that a load bearing connection is thereby made to the sheet metal structure of the vehicle. The composite relationship of the bumper support and the trailer hitch support allows bumper 62 to overlie the mechanism and conceal the mechanism from obvious view.

While one embodiment of this invention has been shown and described, it will be apparent that other adaptations and modifications can be made without departing from the true spirit and scope of the invention.

What is claimed:

1. A trailer support mount in combination with a motor vehicle of the type having the rear frame portion of the vehicle formed of thin sheet metal having both horizontal and vertical underfaces, a pair of brackets formed of relatively thick metal having a first segment and a second segment formed in right angle relationship to each other, means mounting said brackets against the sheet metal frame of said vehicle with the first segment being mounted against the horizontal underface of the frame and the second segment being mounted against the vertical underface of the frame, fasteners interconnecting the first segment to said bracket in permanent affixation to said frame, a U-shaped trailer ball supporting member having legs and a web extending therebetween, each said leg being mounted against the second segment of a said bracket, and fasteners interconnecting said second segment, said legs and the vertical underface of said body in permanent affixation together.

2. A trailer hitch assembly in combination with a sheet metal frame of a motor vehicle comprising: a pair of thick metal brackets, each said bracket having a horizontal segment and a vertical segment, said horizontal segment being mounted in juxtaposition to a horizontal underface of the vehicle sheet metal frame, the vertical segment mounted in juxtaposition to a vertical portion of said vehicle frame, fasteners affixing said horizontal segment of said bracket to the horizontal underface of said vehicle frame, a pair of bumper supporting arms and a pair of trailer supporting arms, each of said pairs of trailer supporting arms and bumper supporting arms being mounted in parallel against the vertical segment of said bracket, bolt means extending through the sheet metal frame of said vehicle, the vertical segment of said bracket, said bumper support arm and said trailer hitch support arms, trailer hitch supporting rod means mounted on the ends of said trailer support arms, a bumper mounted over said trailer hitch supporting rod means, means affixing said bumper to the ends of said bumper support arms, a trailer hitch support mounted on said rod means midway said trailer hitch support arms having a first section extending downwardly below said bumper and a second horizontal section extending outwardly, and a trailer hitch mounted on the end of said second section.

References Cited
UNITED STATES PATENTS

| | | | |
|---|---|---|---|
| 2,452,785 | 11/1948 | Olney | 280—495 |
| 2,549,941 | 4/1951 | Smith | 280—501 |
| 2,562,824 | 7/1951 | Schmidt | 280—501 |
| 2,639,160 | 4/1953 | Studebaker et al. | 280—495 |
| 2,889,155 | 6/1959 | Sandage | 280—495 X |

LEO FRIAGLIA, Primary Examiner

U.S. Cl. X.R.

280—500